United States Patent
Lisseman et al.

(10) Patent No.: US 9,696,223 B2
(45) Date of Patent: Jul. 4, 2017

(54) SINGLE LAYER FORCE SENSOR

(71) Applicant: TK Holdings Inc., Auburn Hills, MI (US)

(72) Inventors: Jason Lisseman, Shelby Township, MI (US); David Andrews, Ortonville, MI (US)

(73) Assignee: TK Holdings Inc., Auburn Hills, MI (US)

( * ) Notice: Subject to any disclaimer, the term of this patent is extended or adjusted under 35 U.S.C. 154(b) by 324 days.

(21) Appl. No.: 14/028,798

(22) Filed: Sep. 17, 2013

(65) Prior Publication Data
US 2014/0076063 A1 Mar. 20, 2014

Related U.S. Application Data

(60) Provisional application No. 61/701,884, filed on Sep. 17, 2012.

(51) Int. Cl.
| | |
|---|---|
| *G01L 1/16* | (2006.01) |
| *G01L 1/20* | (2006.01) |
| *G01L 1/14* | (2006.01) |
| *B82Y 20/00* | (2011.01) |

(52) U.S. Cl.
CPC .............. *G01L 1/20* (2013.01); *G01L 1/142* (2013.01); *B82Y 20/00* (2013.01)

(58) Field of Classification Search
CPC .. G01L 1/16; G01L 1/20; G01L 1/142; H01C 10/10
USPC ....................................................... 73/862.68
See application file for complete search history.

(56) References Cited

U.S. PATENT DOCUMENTS

| | | | |
|---|---|---|---|
| 4,268,815 A | 5/1981 | Eventoff et al. |
| 4,276,538 A | 6/1981 | Eventoff et al. |
| 4,301,337 A | 11/1981 | Eventoff |
| 4,314,227 A | 2/1982 | Eventoff |
| 4,314,228 A | 2/1982 | Eventoff |

(Continued)

FOREIGN PATENT DOCUMENTS

| | | |
|---|---|---|
| DE | 60011078 | 6/2005 |
| DE | 60210951 | 1/2007 |

(Continued)

OTHER PUBLICATIONS

Knite, M., et al., "Polyisoprene-multi-wall carbon nanotube composites for sensing strain," Materials Science and Engineering C., vol. 37, No. 5, Oct. 2, 2006, pp. 1125-1128.

(Continued)

*Primary Examiner* — Lisa Caputo
*Assistant Examiner* — Octavia Hollington
(74) *Attorney, Agent, or Firm* — Meunier Carlin & Curfman LLC

(57) ABSTRACT

A sensor for sensing an application of pressure is disclosed. The sensor includes a substrate, conductive elements and an electroactive layer. First and second conductive elements are supported on the substrate and have elongate edges spaced apart from each other. The electroactive layer has a common surface adhered against the conductive elements. The electroactive layer defines at least one electrical property in a portion of the layer between the conductive elements. The electrical property is configured to vary in relation to a magnitude of the pressure.

30 Claims, 10 Drawing Sheets

(56) References Cited

U.S. PATENT DOCUMENTS

| | | | |
|---|---|---|---|
| 4,315,238 | A | 2/1982 | Eventoff |
| 4,451,714 | A | 5/1984 | Eventoff |
| 4,484,026 | A | 11/1984 | Thornburg |
| 4,489,302 | A | 12/1984 | Eventoff |
| 4,540,979 | A | 9/1985 | Gerger et al. |
| 4,739,299 | A | 4/1988 | Eventoff et al. |
| 4,801,771 | A | 1/1989 | Mizuguchi et al. |
| 4,810,992 | A | 3/1989 | Eventoff |
| 4,929,934 | A | 5/1990 | Ueda et al. |
| 4,963,702 | A | 10/1990 | Yaniger et al. |
| 5,053,585 | A | 10/1991 | Yaniger |
| 5,159,159 | A | 10/1992 | Asher |
| 5,186,055 | A | 2/1993 | Kovacich et al. |
| 5,209,967 | A | 5/1993 | Wright et al. |
| 5,262,778 | A | 11/1993 | Saunders |
| 5,296,837 | A | 3/1994 | Yaniger |
| 5,302,936 | A | 4/1994 | Yaniger |
| 5,365,671 | A | 11/1994 | Yaniger |
| 5,398,962 | A | 3/1995 | Kropp |
| 5,408,873 | A | 4/1995 | Schmidt et al. |
| 5,423,569 | A | 6/1995 | Reighard et al. |
| 5,453,941 | A | 9/1995 | Yoshikawa |
| 5,463,258 | A | 10/1995 | Filion et al. |
| 5,510,783 | A | 4/1996 | Findlater et al. |
| 5,539,259 | A | 7/1996 | Filion et al. |
| 5,659,334 | A | 8/1997 | Yaniger et al. |
| 5,670,988 | A | 9/1997 | Tickle |
| 5,793,297 | A | 8/1998 | Takeuchi et al. |
| 5,828,363 | A | 10/1998 | Yaniger et al. |
| 5,847,639 | A | 12/1998 | Yaniger |
| 5,854,625 | A | 12/1998 | Frisch et al. |
| 5,871,063 | A | 2/1999 | Young |
| 5,907,419 | A | 5/1999 | Martinelli et al. |
| 5,914,658 | A | 6/1999 | Arakawa |
| 5,943,044 | A | 8/1999 | Martinelli et al. |
| 5,965,952 | A | 10/1999 | Podoloff et al. |
| 5,982,519 | A | 11/1999 | Martinelli et al. |
| 6,084,572 | A | 7/2000 | Yaniger |
| 6,239,790 | B1 | 5/2001 | Martinelli et al. |
| 6,291,568 | B1 | 9/2001 | Lussey |
| 6,333,736 | B1 | 12/2001 | Sandbach |
| 6,378,384 | B1 | 4/2002 | Atkinson et al. |
| 6,388,556 | B1 | 5/2002 | Imai et al. |
| 6,396,523 | B1 | 5/2002 | Segal et al. |
| 6,429,846 | B2 | 8/2002 | Rosenberg et al. |
| 6,437,682 | B1 | 8/2002 | Vance |
| 6,495,069 | B1 | 12/2002 | Lussey et al. |
| 6,501,463 | B1 | 12/2002 | Dahley et al. |
| 6,529,122 | B1 | 3/2003 | Magnussen et al. |
| 6,531,951 | B2 | 3/2003 | Serban et al. |
| 6,538,643 | B2 | 3/2003 | Mori et al. |
| 6,563,415 | B2 | 5/2003 | Armstrong |
| 6,646,540 | B1 | 11/2003 | Lussey |
| 6,690,365 | B2 | 2/2004 | Hinckley et al. |
| 6,750,803 | B2 | 6/2004 | Yates et al. |
| 6,758,689 | B1 | 7/2004 | Bair et al. |
| 6,765,557 | B1 | 7/2004 | Segal et al. |
| 6,791,532 | B2 | 9/2004 | Hirano et al. |
| 6,801,191 | B2 | 10/2004 | Mukai et al. |
| 6,809,280 | B2 | 10/2004 | Divigalpitiya et al. |
| 6,809,462 | B2 * | 10/2004 | Pelrine et al. ............... 310/319 |
| 6,820,804 | B2 | 11/2004 | Segal et al. |
| 6,822,640 | B2 | 11/2004 | Derocher |
| 6,850,221 | B1 | 2/2005 | Tickle |
| 6,861,961 | B2 | 3/2005 | Sandbach et al. |
| 6,875,938 | B2 | 4/2005 | Schmiz et al. |
| 6,888,537 | B2 | 5/2005 | Benson et al. |
| 6,906,700 | B1 | 6/2005 | Armstrong |
| 6,909,354 | B2 | 6/2005 | Baker et al. |
| 6,947,031 | B2 | 9/2005 | Sandbach et al. |
| 6,995,752 | B2 | 2/2006 | Lu |
| 7,050,045 | B2 | 5/2006 | Baker et al. |
| 7,084,859 | B1 | 8/2006 | Pryor |
| 7,091,436 | B2 | 8/2006 | Serban |
| 7,091,998 | B2 | 8/2006 | Miller-Smith |
| 7,112,755 | B2 | 9/2006 | Kitano et al. |
| 7,113,179 | B2 | 9/2006 | Baker et al. |
| 7,126,583 | B1 | 10/2006 | Breed |
| 7,154,484 | B2 | 12/2006 | Komata |
| 7,158,122 | B2 | 1/2007 | Roberts |
| 7,161,460 | B2 | 1/2007 | Federspiel |
| 7,170,428 | B2 | 1/2007 | Himberg et al. |
| 7,176,889 | B2 | 2/2007 | Baker et al. |
| 7,190,348 | B2 | 3/2007 | Kennedy et al. |
| 7,213,323 | B2 | 5/2007 | Baker et al. |
| 7,215,330 | B2 | 5/2007 | Rantet |
| 7,250,940 | B2 | 7/2007 | Jayanetti et al. |
| 7,258,026 | B2 * | 8/2007 | Papakostas et al. ..... 73/862.046 |
| 7,295,904 | B2 | 11/2007 | Kanevsky et al. |
| 7,301,435 | B2 | 11/2007 | Lussey et al. |
| 7,310,089 | B2 | 12/2007 | Baker et al. |
| 7,324,095 | B2 | 1/2008 | Sharma |
| 7,336,260 | B2 | 2/2008 | Martin et al. |
| 7,345,675 | B1 | 3/2008 | Minakuchi |
| 7,356,769 | B2 | 4/2008 | Lehtonen |
| 7,377,133 | B2 | 5/2008 | Sandbach et al. |
| 7,388,571 | B2 | 6/2008 | Lowles et al. |
| 7,432,459 | B2 | 10/2008 | Stoschek et al. |
| 7,468,199 | B2 | 12/2008 | Divigalpitiya et al. |
| 7,511,702 | B2 | 3/2009 | Hotelling |
| 7,554,045 | B2 | 6/2009 | Sandbach et al. |
| 7,554,051 | B2 | 6/2009 | Crispin |
| 7,554,531 | B2 | 6/2009 | Baker et al. |
| 7,573,464 | B2 | 8/2009 | Baker et al. |
| 7,576,294 | B2 | 8/2009 | Clemens et al. |
| 7,603,917 | B2 | 10/2009 | Graham et al. |
| 7,614,008 | B2 | 11/2009 | Ording |
| 7,619,616 | B2 | 11/2009 | Rimas-Ribikauskas et al. |
| 7,629,966 | B2 | 12/2009 | Anson |
| 7,649,278 | B2 | 1/2010 | Yoshida et al. |
| 7,683,889 | B2 | 3/2010 | Rimas-Ribikauskas et al. |
| 7,683,890 | B2 | 3/2010 | Geaghan |
| 7,693,631 | B2 | 4/2010 | Yukawa et al. |
| 7,721,609 | B2 | 5/2010 | Wright |
| 7,724,242 | B2 | 5/2010 | Hillis et al. |
| 7,733,209 | B2 | 6/2010 | Kurtz |
| 7,746,327 | B2 | 6/2010 | Miyakoshi |
| 7,772,960 | B2 | 8/2010 | Baker |
| 7,773,075 | B2 | 8/2010 | Otsuka et al. |
| 7,777,730 | B2 | 8/2010 | Geurts et al. |
| 7,791,596 | B2 | 9/2010 | Errico et al. |
| 7,808,488 | B2 | 10/2010 | Martin et al. |
| 7,813,774 | B2 | 10/2010 | Perez-Noguera |
| 7,822,443 | B2 | 10/2010 | Kim et al. |
| 7,863,822 | B2 | 1/2011 | Stoschek et al. |
| 7,898,381 | B2 | 3/2011 | Hatsuda |
| 7,903,090 | B2 | 3/2011 | Soss et al. |
| 7,952,566 | B2 | 5/2011 | Poupyrev et al. |
| 7,973,773 | B2 | 7/2011 | Pryor |
| 8,022,933 | B2 | 9/2011 | Hardacker et al. |
| 8,026,902 | B2 | 9/2011 | Medler et al. |
| 8,026,906 | B2 | 9/2011 | Mölne |
| 8,035,535 | B2 | 10/2011 | Nousiainen |
| 8,037,770 | B2 | 10/2011 | Larson et al. |
| 8,049,730 | B2 | 11/2011 | Joguet et al. |
| 8,049,731 | B2 | 11/2011 | Baker et al. |
| 8,049,737 | B2 | 11/2011 | Cho et al. |
| 8,052,293 | B2 | 11/2011 | Hurwitz |
| 8,059,104 | B2 | 11/2011 | Shahoian et al. |
| 8,063,322 | B2 | 11/2011 | Katsurahira |
| 8,063,886 | B2 | 11/2011 | Serban et al. |
| 8,072,439 | B2 | 12/2011 | Hillis et al. |
| 8,072,440 | B2 | 12/2011 | Pryor |
| 8,081,165 | B2 | 12/2011 | Reiner |
| 8,094,130 | B2 | 1/2012 | Griffin et al. |
| 8,095,278 | B2 | 1/2012 | Schaaf et al. |
| 8,098,236 | B2 | 1/2012 | Klein et al. |
| 8,113,065 | B2 | 2/2012 | Ohsato et al. |
| 8,120,586 | B2 | 2/2012 | Hsu et al. |
| 8,120,588 | B2 | 2/2012 | Klinghult |
| 8,130,207 | B2 | 3/2012 | Nurmi et al. |
| 8,134,535 | B2 | 3/2012 | Choi et al. |
| 8,139,038 | B2 | 3/2012 | Chueh et al. |
| 8,144,133 | B2 | 3/2012 | Wang et al. |

(56) References Cited

U.S. PATENT DOCUMENTS

| | | |
|---|---|---|
| 8,149,211 B2 | 4/2012 | Hayakawa et al. |
| 8,151,210 B2 | 4/2012 | Nezu et al. |
| 8,154,528 B2 | 4/2012 | Chen et al. |
| 8,159,473 B2 | 4/2012 | Cheng et al. |
| 8,169,295 B2 | 5/2012 | Walkington |
| 8,171,431 B2 | 5/2012 | Grossman et al. |
| 8,184,093 B2 | 5/2012 | Tsuiki |
| 8,184,106 B2 | 5/2012 | Serban |
| 8,188,985 B2 | 5/2012 | Hillis et al. |
| 8,199,116 B2 | 6/2012 | Jeon et al. |
| 8,203,454 B2 | 6/2012 | Knight et al. |
| 8,212,790 B2 | 7/2012 | Rimas-Ribikauskas et al. |
| 8,214,105 B2 | 7/2012 | Daly et al. |
| 8,222,799 B2 * | 7/2012 | Polyakov et al. ............ 310/365 |
| 8,228,305 B2 | 7/2012 | Pryor |
| 8,229,603 B2 | 7/2012 | Miyata et al. |
| 8,237,324 B2 * | 8/2012 | Pei et al. ..................... 310/306 |
| 8,237,537 B2 | 8/2012 | Kurtz |
| 8,239,784 B2 | 8/2012 | Hotelling et al. |
| 8,243,035 B2 | 8/2012 | Abe et al. |
| 8,243,039 B2 | 8/2012 | Trachte |
| 8,253,699 B2 | 8/2012 | Son |
| 8,269,731 B2 | 9/2012 | Molne |
| 8,368,505 B2 * | 2/2013 | Deppiesse ............ H03K 17/965 338/114 |
| 8,698,764 B1 | 4/2014 | Karakotsios et al. |
| 9,030,419 B1 | 5/2015 | Freed |
| 2001/0040551 A1 | 11/2001 | Yates et al. |
| 2002/0041164 A1 | 4/2002 | Kim |
| 2002/0054060 A1 | 5/2002 | Schena |
| 2002/0097229 A1 | 7/2002 | Rose et al. |
| 2002/0135457 A1 | 9/2002 | Sandbach et al. |
| 2003/0011576 A1 | 1/2003 | Sandbach et al. |
| 2003/0043014 A1 | 3/2003 | Nakazawa et al. |
| 2003/0076968 A1 | 4/2003 | Rast |
| 2003/0083131 A1 | 5/2003 | Armstrong |
| 2003/0160808 A1 | 8/2003 | Foote et al. |
| 2004/0071471 A1 | 4/2004 | Baker et al. |
| 2004/0207605 A1 | 10/2004 | MacKey et al. |
| 2004/0217331 A1 | 11/2004 | Lussey et al. |
| 2004/0252007 A1 | 12/2004 | Lussey et al. |
| 2005/0052426 A1 | 3/2005 | Hagermoser et al. |
| 2005/0052427 A1 | 3/2005 | Wu et al. |
| 2005/0067889 A1 | 3/2005 | Chernoff |
| 2005/0110769 A1 | 5/2005 | DaCosta et al. |
| 2005/0156705 A1 | 7/2005 | Baker et al. |
| 2005/0273218 A1 | 12/2005 | Breed et al. |
| 2006/0025897 A1 | 2/2006 | Shostak et al. |
| 2006/0028454 A1 | 2/2006 | Branton et al. |
| 2006/0054479 A1 | 3/2006 | Iisaka |
| 2006/0113880 A1 | 6/2006 | Pei et al. |
| 2006/0177212 A1 | 8/2006 | Lamborghini et al. |
| 2006/0202954 A1 | 9/2006 | Ho |
| 2006/0248478 A1 | 11/2006 | Liau |
| 2006/0255903 A1 | 11/2006 | Lussey et al. |
| 2007/0056493 A1 | 3/2007 | Burkitt et al. |
| 2007/0062753 A1 | 3/2007 | Yoshida et al. |
| 2007/0100523 A1 | 5/2007 | Trachte |
| 2007/0132736 A1 | 6/2007 | Crispin |
| 2007/0141939 A1 | 6/2007 | Sandbach et al. |
| 2007/0146313 A1 | 6/2007 | Newman et al. |
| 2007/0146342 A1 | 6/2007 | Medler et al. |
| 2007/0152959 A1 | 7/2007 | Peters |
| 2007/0176902 A1 | 8/2007 | Newman et al. |
| 2007/0229478 A1 | 10/2007 | Rosenberg et al. |
| 2007/0289859 A1 | 12/2007 | Sandbach et al. |
| 2008/0024438 A1 | 1/2008 | Collins et al. |
| 2008/0024454 A1 | 1/2008 | Everest |
| 2008/0030479 A1 | 2/2008 | Lowles et al. |
| 2008/0030482 A1 | 2/2008 | Elwell et al. |
| 2008/0036743 A1 | 2/2008 | Westerman et al. |
| 2008/0060854 A1 | 3/2008 | Perlin |
| 2008/0062145 A1 | 3/2008 | Shahoian et al. |
| 2008/0079604 A1 | 4/2008 | Madonna et al. |
| 2008/0088577 A1 | 4/2008 | Lenneman et al. |
| 2008/0088600 A1 | 4/2008 | Prest et al. |
| 2008/0094367 A1 | 4/2008 | Van De Ven et al. |
| 2008/0130126 A1 | 6/2008 | Brooks et al. |
| 2008/0170043 A1 | 7/2008 | Soss et al. |
| 2008/0202912 A1 | 8/2008 | Boddie et al. |
| 2008/0211766 A1 | 9/2008 | Westerman et al. |
| 2008/0230283 A1 | 9/2008 | Yoon et al. |
| 2008/0264183 A1 | 10/2008 | Graham et al. |
| 2008/0271933 A1 | 11/2008 | Morimoto |
| 2008/0278455 A1 | 11/2008 | Atkins et al. |
| 2008/0284743 A1 | 11/2008 | Hsu et al. |
| 2008/0289886 A1 | 11/2008 | Burkitt |
| 2008/0296073 A1 | 12/2008 | McDermid |
| 2008/0296140 A1 | 12/2008 | Yoshihara et al. |
| 2008/0302014 A1 | 12/2008 | Szczerba et al. |
| 2008/0303799 A1 | 12/2008 | Schwesig et al. |
| 2008/0303802 A1 | 12/2008 | Destura et al. |
| 2008/0309624 A1 | 12/2008 | Hotelling |
| 2008/0309626 A1 | 12/2008 | Westerman et al. |
| 2008/0316181 A1 | 12/2008 | Nurmi |
| 2009/0002325 A1 | 1/2009 | Jha et al. |
| 2009/0009482 A1 | 1/2009 | McDermid |
| 2009/0020343 A1 | 1/2009 | Rothkopf et al. |
| 2009/0027353 A1 | 1/2009 | Im et al. |
| 2009/0061823 A1 | 3/2009 | Chu |
| 2009/0087655 A1 | 4/2009 | Yamada et al. |
| 2009/0095541 A1 | 4/2009 | Lee |
| 2009/0128507 A1 | 5/2009 | Hoshino et al. |
| 2009/0140985 A1 | 6/2009 | Liu |
| 2009/0140989 A1 | 6/2009 | Ahlgren |
| 2009/0140994 A1 | 6/2009 | Tanaka et al. |
| 2009/0140996 A1 | 6/2009 | Takashima et al. |
| 2009/0151447 A1 | 6/2009 | Jin et al. |
| 2009/0153522 A1 | 6/2009 | Chou |
| 2009/0160529 A1 | 6/2009 | Lamborghini |
| 2009/0160793 A1 | 6/2009 | Rekimoto |
| 2009/0167722 A1 | 7/2009 | Villain |
| 2009/0174674 A1 | 7/2009 | Forutanpour |
| 2009/0184921 A1 | 7/2009 | Scott et al. |
| 2009/0201261 A1 | 8/2009 | Day |
| 2009/0237374 A1 | 9/2009 | Li et al. |
| 2009/0241378 A1 | 10/2009 | Ellis |
| 2009/0244017 A1 | 10/2009 | Pala et al. |
| 2009/0249191 A1 | 10/2009 | Leoutsarakos et al. |
| 2009/0256807 A1 | 10/2009 | Nurmi |
| 2009/0256817 A1 | 10/2009 | Perlin et al. |
| 2009/0258677 A1 | 10/2009 | Ellis et al. |
| 2009/0265670 A1 | 10/2009 | Kim et al. |
| 2009/0267921 A1 | 10/2009 | Pryor |
| 2009/0273573 A1 | 11/2009 | Hotelling |
| 2009/0279811 A1 | 11/2009 | Kilburn et al. |
| 2009/0309616 A1 | 12/2009 | Klinghult et al. |
| 2009/0322695 A1 | 12/2009 | Cho et al. |
| 2009/0327977 A1 | 12/2009 | Bachfischer et al. |
| 2010/0013774 A1 | 1/2010 | Chen et al. |
| 2010/0020030 A1 | 1/2010 | Kim et al. |
| 2010/0024573 A1 | 2/2010 | Daverman et al. |
| 2010/0026640 A1 | 2/2010 | Kim et al. |
| 2010/0039393 A1 | 2/2010 | Pratt et al. |
| 2010/0045612 A1 | 2/2010 | Molne |
| 2010/0045624 A1 | 2/2010 | Hisatsugu et al. |
| 2010/0053078 A1 | 3/2010 | Kim et al. |
| 2010/0053116 A1 | 3/2010 | Daverman et al. |
| 2010/0062148 A1 | 3/2010 | Lussey et al. |
| 2010/0066697 A1 | 3/2010 | Jacomet et al. |
| 2010/0079391 A1 | 4/2010 | Joung |
| 2010/0079395 A1 | 4/2010 | Kim et al. |
| 2010/0085169 A1 | 4/2010 | Poupyrev et al. |
| 2010/0090973 A1 | 4/2010 | Algreatly |
| 2010/0097335 A1 | 4/2010 | Jung et al. |
| 2010/0097336 A1 | 4/2010 | Gomes et al. |
| 2010/0099394 A1 | 4/2010 | Hainzl |
| 2010/0102922 A1 | 4/2010 | Walkington |
| 2010/0110018 A1 | 5/2010 | Faubert et al. |
| 2010/0110026 A1 | 5/2010 | Kis et al. |
| 2010/0117978 A1 | 5/2010 | Shirado |
| 2010/0123667 A1 | 5/2010 | Kim et al. |
| 2010/0123678 A1 | 5/2010 | Kim et al. |
| 2010/0123686 A1 | 5/2010 | Klinghult et al. |

(56) References Cited

U.S. PATENT DOCUMENTS

| | | |
|---|---|---|
| 2010/0126840 A1 | 5/2010 | Walkington |
| 2010/0127975 A1 | 5/2010 | Jensen |
| 2010/0127983 A1 | 5/2010 | Irani et al. |
| 2010/0141410 A1 | 6/2010 | Aono et al. |
| 2010/0153879 A1 | 6/2010 | Rimas-Ribikauskas et al. |
| 2010/0156818 A1 | 6/2010 | Burrough et al. |
| 2010/0168998 A1 | 7/2010 | Matsunaga |
| 2010/0171713 A1 | 7/2010 | Kwok et al. |
| 2010/0214239 A1 | 8/2010 | Wu |
| 2010/0222972 A1 | 9/2010 | Hustyi |
| 2010/0231540 A1 | 9/2010 | Cruz-Hernandez et al. |
| 2010/0250071 A1 | 9/2010 | Pala et al. |
| 2010/0253645 A1 | 10/2010 | Bolender |
| 2010/0265170 A1 | 10/2010 | Norieda |
| 2010/0271325 A1 | 10/2010 | Conte et al. |
| 2010/0277438 A1 | 11/2010 | Kawashima et al. |
| 2010/0283749 A1 | 11/2010 | Walkington |
| 2010/0308844 A1 | 12/2010 | Day et al. |
| 2010/0315267 A1 | 12/2010 | Chung et al. |
| 2010/0315349 A1 | 12/2010 | Choi |
| 2010/0321310 A1 | 12/2010 | Kim et al. |
| 2011/0006980 A1 | 1/2011 | Taniguchi et al. |
| 2011/0007023 A1 | 1/2011 | Abrahamsson et al. |
| 2011/0021251 A1 | 1/2011 | Lindén |
| 2011/0022393 A1 | 1/2011 | Wäller et al. |
| 2011/0030502 A1 | 2/2011 | Lathrop |
| 2011/0032203 A1 | 2/2011 | Pryor |
| 2011/0037721 A1 | 2/2011 | Cranfill et al. |
| 2011/0043468 A1 | 2/2011 | Lathrop et al. |
| 2011/0043491 A1 | 2/2011 | Oh |
| 2011/0046788 A1 | 2/2011 | Daly et al. |
| 2011/0050588 A1 | 3/2011 | Li et al. |
| 2011/0050589 A1 | 3/2011 | Yan et al. |
| 2011/0050591 A1 | 3/2011 | Kim et al. |
| 2011/0050629 A1 | 3/2011 | Homma et al. |
| 2011/0054359 A1 | 3/2011 | Sazonov et al. |
| 2011/0057899 A1 | 3/2011 | Sleeman et al. |
| 2011/0063248 A1 | 3/2011 | Yoon |
| 2011/0069024 A1 | 3/2011 | Kim |
| 2011/0074724 A1 | 3/2011 | Pryor |
| 2011/0082627 A1 | 4/2011 | Small et al. |
| 2011/0087983 A1 | 4/2011 | Shim |
| 2011/0107272 A1 | 5/2011 | Aguilar |
| 2011/0109578 A1 | 5/2011 | Wäller et al. |
| 2011/0115736 A1 | 5/2011 | Joguet et al. |
| 2011/0128164 A1 | 6/2011 | Kang et al. |
| 2011/0128235 A1 | 6/2011 | Rogers et al. |
| 2011/0128250 A1 | 6/2011 | Murphy et al. |
| 2011/0141052 A1 | 6/2011 | Bernstein et al. |
| 2011/0141053 A1 | 6/2011 | Bulea et al. |
| 2011/0175754 A1 | 7/2011 | Karpinsky |
| 2011/0175844 A1 | 7/2011 | Berggren |
| 2011/0175845 A1 | 7/2011 | Honda et al. |
| 2011/0181430 A1 | 7/2011 | Hu et al. |
| 2011/0181546 A1 | 7/2011 | Joguet et al. |
| 2011/0187674 A1 | 8/2011 | Baker et al. |
| 2011/0193813 A1 | 8/2011 | Gralewski et al. |
| 2011/0205151 A1 | 8/2011 | Newton et al. |
| 2011/0205162 A1 | 8/2011 | Wäller et al. |
| 2011/0205182 A1 | 8/2011 | Miyazawa et al. |
| 2011/0210926 A1 | 9/2011 | Pasquero et al. |
| 2011/0216015 A1 | 9/2011 | Edwards |
| 2011/0221564 A1 | 9/2011 | Deppiesse et al. |
| 2011/0221684 A1 | 9/2011 | Rydenhag |
| 2011/0221693 A1 | 9/2011 | Miyazaki |
| 2011/0221694 A1 | 9/2011 | Karaoguz et al. |
| 2011/0227870 A1 | 9/2011 | Kim |
| 2011/0227872 A1 | 9/2011 | Huska et al. |
| 2011/0239110 A1 | 9/2011 | Garrett et al. |
| 2011/0241850 A1 | 10/2011 | Bosch et al. |
| 2011/0242029 A1 | 10/2011 | Kasahara et al. |
| 2011/0245992 A1 | 10/2011 | Stahlin et al. |
| 2011/0248728 A1 | 10/2011 | Maruyama |
| 2011/0248942 A1 | 10/2011 | Yana et al. |
| 2011/0248948 A1 | 10/2011 | Griffin et al. |
| 2011/0253948 A1 | 10/2011 | Lussey et al. |
| 2011/0260965 A1 | 10/2011 | Kim et al. |
| 2011/0265002 A1 | 10/2011 | Hong et al. |
| 2011/0267294 A1 | 11/2011 | Kildal |
| 2011/0273394 A1 | 11/2011 | Young et al. |
| 2011/0275412 A1 | 11/2011 | Khawand |
| 2011/0278078 A1 | 11/2011 | Schediwy et al. |
| 2011/0290038 A1 | 12/2011 | Hoshino et al. |
| 2011/0304559 A1 | 12/2011 | Pasquero |
| 2011/0304581 A1 | 12/2011 | An et al. |
| 2011/0316811 A1 | 12/2011 | Kitagawa |
| 2012/0001870 A1 | 1/2012 | Lee et al. |
| 2012/0013573 A1 | 1/2012 | Liu et al. |
| 2012/0019448 A1 | 1/2012 | Pitkanen et al. |
| 2012/0019463 A1 | 1/2012 | Ng et al. |
| 2012/0026124 A1 | 2/2012 | Li et al. |
| 2012/0032899 A1 | 2/2012 | Waeller et al. |
| 2012/0032907 A1 | 2/2012 | Koizumi et al. |
| 2012/0032915 A1 | 2/2012 | Wittorf |
| 2012/0044169 A1 | 2/2012 | Enami |
| 2012/0044172 A1 | 2/2012 | Ohki et al. |
| 2012/0050159 A1 | 3/2012 | Yu et al. |
| 2012/0050208 A1 | 3/2012 | Dietz |
| 2012/0056818 A1 | 3/2012 | Shafi et al. |
| 2012/0056837 A1 | 3/2012 | Park et al. |
| 2012/0062603 A1 | 3/2012 | Mizunuma et al. |
| 2012/0068946 A1 | 3/2012 | Tang et al. |
| 2012/0068965 A1 | 3/2012 | Wada et al. |
| 2012/0068969 A1 | 3/2012 | Bogana et al. |
| 2012/0081327 A1 | 4/2012 | Heubel et al. |
| 2012/0086659 A1 | 4/2012 | Perlin et al. |
| 2012/0086670 A1 | 4/2012 | Teil et al. |
| 2012/0092250 A1 | 4/2012 | Hadas et al. |
| 2012/0092279 A1 | 4/2012 | Martin |
| 2012/0092294 A1 | 4/2012 | Ganapathi et al. |
| 2012/0092299 A1 | 4/2012 | Harada et al. |
| 2012/0092324 A1 | 4/2012 | Buchan et al. |
| 2012/0105358 A1 | 5/2012 | Momeyer et al. |
| 2012/0105367 A1 | 5/2012 | Son et al. |
| 2012/0113028 A1 | 5/2012 | Marsden et al. |
| 2012/0113054 A1 | 5/2012 | Hashimoto et al. |
| 2012/0113061 A1 | 5/2012 | Ikeda |
| 2012/0120009 A1 | 5/2012 | Lussey et al. |
| 2012/0126959 A1* | 5/2012 | Zarrabi et al. ............. 340/407.1 |
| 2012/0127088 A1 | 5/2012 | Pance et al. |
| 2012/0127107 A1 | 5/2012 | Miyashita et al. |
| 2012/0127179 A1 | 5/2012 | Aspelin |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154315 A1 | 6/2012 | Aono |
| 2012/0154316 A1 | 6/2012 | Kono |
| 2012/0154317 A1 | 6/2012 | Aono |
| 2012/0154318 A1 | 6/2012 | Aono |
| 2012/0154328 A1 | 6/2012 | Kono |
| 2012/0154329 A1 | 6/2012 | Shinozaki |
| 2012/0154330 A1 | 6/2012 | Shimizu |
| 2012/0162122 A1 | 6/2012 | Geaghan |
| 2012/0169609 A1 | 7/2012 | Britton |
| 2012/0169617 A1 | 7/2012 | Mäenpää |
| 2012/0169635 A1 | 7/2012 | Liu |
| 2012/0169636 A1 | 7/2012 | Liu |
| 2012/0188181 A1 | 7/2012 | Ha et al. |
| 2012/0194460 A1 | 8/2012 | Kuwabara et al. |
| 2012/0194466 A1 | 8/2012 | Posamentier |
| 2012/0199921 A1 | 8/2012 | Tanaka et al. |
| 2012/0204653 A1 | 8/2012 | August et al. |
| 2012/0205165 A1 | 8/2012 | Strittmatter et al. |
| 2012/0206393 A1 | 8/2012 | Hillis et al. |
| 2012/0218212 A1 | 8/2012 | Yu et al. |
| 2012/0229424 A1 | 9/2012 | Behles et al. |
| 2012/0235940 A1 | 9/2012 | Ludwig |
| 2013/0002538 A1 | 1/2013 | Mooring et al. |
| 2013/0038437 A1 | 2/2013 | Talati et al. |
| 2013/0063389 A1 | 3/2013 | Moore |
| 2013/0113715 A1 | 5/2013 | Grant et al. |
| 2013/0128587 A1 | 5/2013 | Lisseman et al. |
| 2013/0307788 A1 | 11/2013 | Rao et al. |
| 2013/0338847 A1 | 12/2013 | Lisseman et al. |

(56) References Cited

U.S. PATENT DOCUMENTS

| | | | |
|---|---|---|---|
| 2014/0253504 | A1 | 9/2014 | Noshadi et al. |
| 2014/0267113 | A1 | 9/2014 | Lisseman et al. |
| 2014/0267114 | A1 | 9/2014 | Lisseman et al. |
| 2015/0067513 | A1 | 3/2015 | Zambetti et al. |
| 2015/0067596 | A1 | 3/2015 | Brown et al. |

FOREIGN PATENT DOCUMENTS

| | | |
|---|---|---|
| DE | 60130983 | 7/2008 |
| EP | 1640697 | 3/2006 |
| EP | 1887595 | 2/2008 |
| GB | 2423646 | 8/2006 |
| GB | 2445505 | 7/2008 |
| GB | 2448893 | 11/2008 |
| GB | 2450587 | 12/2008 |
| GB | 2452714 | 3/2009 |
| GB | 2454619 | 5/2009 |
| GB | 2462920 | 3/2010 |
| GB | 2465077 | 5/2010 |
| GB | 2465713 | 6/2010 |
| GB | 2468870 | 9/2010 |
| GB | 2437997 | 7/2011 |
| GB | 2443658 | 9/2011 |
| JP | 58-141835 | 9/1983 |
| JP | 64-66522 | 3/1989 |
| JP | 06-037056 U | 5/1994 |
| JP | 2005-175815 | 6/2005 |
| JP | 2006-129893 | 5/2006 |
| JP | 2008-181709 | 8/2008 |
| JP | 2009-008613 | 1/2009 |
| JP | 2009-521006 | 5/2009 |
| JP | 2009-186452 | 8/2009 |
| JP | 2009-244931 | 10/2009 |
| JP | 2010-511916 | 4/2010 |
| JP | 2012/058159 | 3/2012 |
| KR | 10-1999-0047429 | 7/1999 |
| KR | 10-2009-0074571 | 7/2009 |
| KR | 10-2010-0087721 | 8/2010 |
| KR | 10-2011-0014115 | 2/2011 |
| KR | 10-2011-0042924 | 4/2011 |
| WO | 98/03193 | 7/1998 |
| WO | 99/38173 | 7/1999 |
| WO | 00/79546 | 12/2000 |
| WO | 01/88935 | 11/2001 |
| WO | 0188935 | 11/2001 |
| WO | 02/099822 | 12/2002 |
| WO | 2005/029514 | 3/2005 |
| WO | 2006/016138 | 2/2006 |
| WO | 2006/123616 | 11/2006 |
| WO | 2007/072319 | 6/2007 |
| WO | 2007/107522 | 9/2007 |
| WO | 2008-062403 | 5/2008 |
| WO | 2008/135787 | 11/2008 |
| WO | 2009/034313 | 3/2009 |
| WO | 2010/023449 | 9/2010 |
| WO | 2010/109186 | 9/2010 |
| WO | 2011/045929 | 4/2011 |
| WO | 2012-001428 | 1/2012 |
| WO | 2012-088549 | 6/2012 |

OTHER PUBLICATIONS

International Search Report and Written Opinion, dated Dec. 17, 2013, in connection with corresponding International Application No. PCT/US2013/060046.
Office Action dated Nov. 4, 2014, received in connection with JP Patent Application No. 2011-075258. (English Translation attached).
Office Action dated Mar. 11, 2013 in U.S. Appl. No. 13/076,226, which issued as U.S. Pat. No. 9,007,190 on Apr. 14, 2015.
Office Action dated Feb. 13, 2014 in U.S. Appl. No. 13/076,226, which issued as U.S. Pat. No. 9,007,190 on Apr. 14, 2015.
Office Action dated Sep. 11, 2014 in U.S. Appl. No. 13/076,226, which issued as U.S. Pat. No. 9,007,190 on Apr. 14, 2015.
U.S. Appl. No. 13/076,226, filed Mar. 30, 2011, which has now issued as U.S. Pat. No. 9,007,190 on Apr. 14, 2015, and its file history.
Co-pending U.S. Appl. No. 13/863,363, filed Apr. 15, 2013 and its file history.
Office Action dated Nov. 10, 2015 in U.S. Appl. No. 13/863,363.
International Preliminary Report on Patentability and Written Opinion of the U.S. International Searching Authority from Application No. PCT/US2013/060046 mailed Mar. 26, 2015.
Co-pending U.S. Appl. No. 14/211,475, filed Mar. 14, 2014 and its file history.
Co-pending U.S. Appl. No. 14/211,665, filed Mar. 14, 2014, and its file history.
Co-pending U.S. Appl. No. 13/673,463, filed Nov. 9, 2012, and its file history.
International Search Report and Written Opinion dated Mar. 29, 2013 issued for PCT/US2012/064409.
International Search Report and Written Opinion dated Jun. 21, 2013 issued for PCT/US2013/030417.
International Search Report and Written Opinion dated Jun. 24, 2014 issued for PCT/US2014/027735.
International Search Report and Written Opinion dated Jun. 26, 2014 issued for PCT/US2014/027777.
Non-Final Office Action dated Feb. 18, 2015 in U.S. Appl. No. 13/673,463.
Final Office Action dated Aug. 20, 2015 in U.S. Appl. No. 13/673,463.
Advisory Action dated Nov. 5, 2015 in U.S. Appl. No. 13/673,463.
Non-Final Office Action dated Jan. 21, 2016 in U.S. Appl. No. 13/673,463.
Final Office Action dated Jun. 3, 2016 in U.S. Appl. No. 13/863,363.
Non-Final Office Action dated Dec. 17, 2015 in U.S. Appl. No. 14/211,475.
Final Office Action dated Aug. 16, 2016 in U.S. Appl. No. 14/211,475.
Non-Final Office Action dated Dec. 15, 2015 in U.S. Appl. No. 14/211,665.
Final Office Action dated Aug. 16, 2016 in U.S. Appl. No. 14/211,665.
Office Action, dated Oct. 18, 2016, received in connection with JP Application No. 2014-541319. (English translation attached).
Office Action, dated Nov. 3, 2016, received in connection with U.S. Appl. No. 13/863,363.
Office Action, dated Aug. 16, 2016, received in connection with U.S. Appl. No. 14/211,665.
Office Action, dated Aug. 24, 2016, received in connection with U.S. Appl. No. 13/673,463.
Office Action, dated Aug. 16, 2016, received in connection with U.S. Appl. No. 14/211,475.
Office Action, dated Jan. 23, 2017, received in connection with U.S. Appl. No. 14/211,475.
Office Action, dated Jan. 23, 2017, received in connection with U.S. Appl. No. 14/211,665.
Office Action, dated May 2, 2017, received in connection with Japanese Application No. 2015-532133 (English-language translation attached).

* cited by examiner

SINGLE LAYER FORCE SENSOR

CROSS-REFERENCE TO RELATED APPLICATIONS

This application claims the benefit of U.S. Provisional Patent Application No. 61/701,884, filed on Sep. 17, 2012, entitled "SINGLE LAYER FORCE SENSOR," the disclosure of which is expressly incorporated herein by reference in its entirety.

BACKGROUND

The present disclosure relates to pressure sensitive sensors. In particular, the disclosure relates to the use of electroactive materials to create single-layer pressure sensors.

Pressure sensors have been used in a wide range of applications. Most pressure sensors rely on deflection elements to span empty spaces or gaps between conductors. Such deflection elements have the advantage of avoiding inadvertent activation of the sensor through touching of the conducting elements during minor load application.

Pressure sensors relying on piezoelectric effects generate an electrical signal in response to mechanical placement or pressure. The piezoelectric materials, however, do not generate signals that are universally applicable to a full range of control algorithms.

A need remains for pressure sensors that are adaptable to different ranges of control algorithms.

SUMMARY

A sensor for sensing an application of pressure is disclosed. The sensor includes a substrate, conductive elements and an electroactive layer. First and second conductive elements are supported on the substrate and have elongate edges spaced apart from each other. The electroactive layer has a common surface adhered against the conductive elements. The electroactive layer defines at least one electrical property in a portion of the layer between the conductive elements. The electrical property is configured to vary in relation to a magnitude of the pressure.

The electrical property may be a resistance or a capacitance.

A logic device may be connected to the conductive elements and configured to determine the electrical property. The first and second conductive elements may be connected to a power source. The electrical property may be a resistance generating a voltage difference between the conductive elements. The voltage difference varies in proportion to the magnitude of the pressure.

The sensor may also include a calibrator configured to determine the magnitude of the pressure using the voltage difference.

The electroactive layer may comprise a quantum tunneling composite (QTC) or a nanotube doped ink or a doped carbon. The doped carbon may be an ink, for example, printed onto a second substrate and laminated on the substrate and conductive elements.

The conductive elements may have different patterns, such as a square or spiral pattern. The square pattern may include interdigitated fingers. The spiral pattern may include intertwined conductive elements. The first conductive element may include a plurality of first fingers. The second conductive element may include a plurality of second fingers. The fingers may extend between each other, such as in a parallel, spaced array. The fingers may alternate with each other across the common surface to form a plurality of adjacent edges spaced apart from each other. Also, the fingers may extend in different directions.

The first fingers may also extend from a first trunk trace and the second fingers extend from a second trunk trace. The first trunk trace may have a first concavity. The second trunk trace may have a second concavity. The first and second fingers may extend into the concavity in opposite directions from each other. The concavities may face each other to define a circular pressure sensitive region.

Also, the fingers may have varied spacing. One pair of first and second fingers may be more closely spaced than another pair of first and second fingers. Closer spacing may be used to provide greater sensitivity to pressure.

The electroactive layer may also be varied in its sensitivity. Some areas may have a greater resistance between fingers. Other areas may have lower resistance between fingers.

The electrical property of the electroactive layer may exhibit a characteristic curve, such as a relationship between pressure and resistance. This characteristic may be varied as a function of a distance between the elongate edges of the conductive elements. An increase in the distance may, for example, increase a threshold for detection of the application of pressure. Also, a width of the conductive elements may be varied to increase the threshold. Also, increases in the distance or width may increase a radius of curvature of the characteristic curve.

The width and/or spacing of the conductive elements or fingers may range from 10 microns to 500 microns. Lower ranges may be accomplished, for example, using printing, such as aerosol jet printing. Closer spacing and smaller widths may be facilitated by printing the conductive elements with carbon ink.

The electroactive layer may include a conductive carbon ink printed on a second substrate and adhered against the conductive elements using an adhesive layer. The adhesive layer may be, for example, 5 microns thick and comprised of liquid or pressure sensitive adhesive.

The sensor may include a coating deposited on the electroactive layer. The coating may protect against the environment, such as by being impermeable to water. Also, the coating may be configured to adjust a characteristic response curve of the sensor. For example, the coating may be configured to increase a radius of curvature of the characteristic curve of the sensor. The coating may have variations in hardness, stiffness, thickness, material composition or shape, for example, to modify the characteristic response curve of the sensor.

The coating may be applied by printing, chemical vapor deposition, atomic layer deposition, spraying or dipping, for example. Coating materials may include parylene, silicone and dielectric, for example. The coating may also be formed as a second substrate that is adhered over or to the electroactive layer. The coating may have a dome shape or be a separate single-thickness layer.

The electroactive layer may include a portion comprising a compliant molding. The compliant molding may include a conductive polymer, such as a phenolic resole or a conductive elastomer.

A top side of the electroactive layer may include a force-deflection element, such as a detent or secondary feature that decreases a contact area of the force-deflection element.

In another implementation, the first and second conductive elements may have a same length and width adhered against the electroactive layer. In addition, the conductive elements may extend in parallel in a same direction. They may also be equally spaced from each other. A plurality of first and second conductive elements may be employed as dedicated channels. The conductive elements, for example, may have a spacing and width in a range of 250 to 500 micrometers.

DETAILED DESCRIPTION

Figure 1:
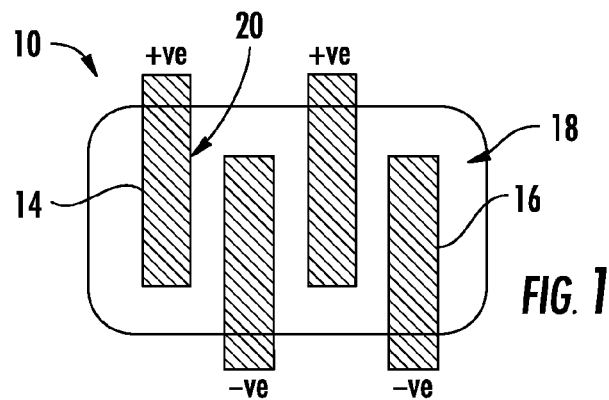
FIG. 1 is a schematic of a pressure sensor.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

With reference now to FIGS. 1-4, implementations of the present invention include a pressure sensor 10 including a substrate 12, a plurality of first conductive elements 14, a plurality of second conductive elements 16 and an electroactive layer 18. The conductive elements 14, 16 are supported on the substrate 12 and have elongate edges 20 spaced apart from each other. The electroactive layer 18 has a common surface 22 adhered against the first and second conductive elements 14, 16. The electroactive layer 18 defines at least one electrical property, such as a resistance, between the first and second conductive elements. The electrical property is configured, such as through the use of a quantum tunneling composite or a doped material, to vary in relation to a magnitude of an applied pressure. The pressure sensor 10 provides advantages including a gapless construction for more compact, robust hardware. Also, the geometry and arrangement of the conductive elements 14, 16, the electroactive layer 18 and other components allows selective adjustment of the force-response curve of the sensor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-4, the substrate 12 may be a foundational surface upon which the remaining components are supported. The substrate 12 may be comprised, for example, of a relatively rigid, flat, planar surface that is sized and shaped to match the peripheral shape of the electroactive layer 18. Such characteristics promote a predictable response to pressure by the intervening electroactive layer 18 and the conductive elements 14, 16.

Optionally, the compressibility of the substrate 12 may be adjusted to adjust recruitment of the electroactive layer 18 and conductive elements 14, 16. Increased compressibility may, for example, result in bending and deflection of the electroactive layer and modifying its response to the application of pressure. Also, additional adjacent conductive elements may be deflected to generate changes in conduction characteristics. A soft substrate may also have appealing soft-touch characteristics suitable for some surfaces, such as automotive interiors or textile supported controls.

The substrate 12 may have different surface contours than flat, such as curved, textured or angled. Surface variations may adapt the sensor 10 to fit contours of various controllers. For example, a rounded shape may be employed for a window control in an automobile interior to fit the rounded surface adjacent to the window. A cylindrical shape may be used to wrap around a steering wheel.

The substrate 12 may also be fashioned to have different perimeter shapes for fitting into controllers based on the desired control dynamic. For example, a strip shape may be used for long, gliding gestures or swipes applying pressure to the sensor 10. Expanded two dimensional shapes may facilitate sensing in two dimensions (X-Y) as well as the force (Z) dimension. Circular shapes may be employed for circumferential position detection or detection of circular or dial motions along with pressure.

Generally, the substrate 12 should have limited or no conductivity to prevent inadvertent communication between the adjacently arranged first and second conductive elements 14, 16. The substrate 12 may also be constructed from an electroactive material to facilitate electrical communication between conductive elements during application of a pressure to the pressure sensor 10.

Figure 2:
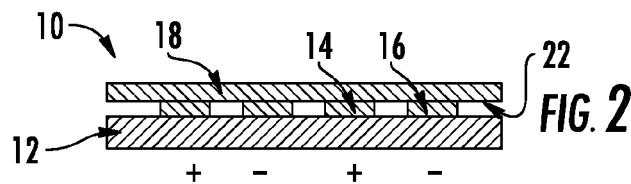
FIG. 2 is another schematic of the pressure sensor of FIG. 1.
Figure 3:
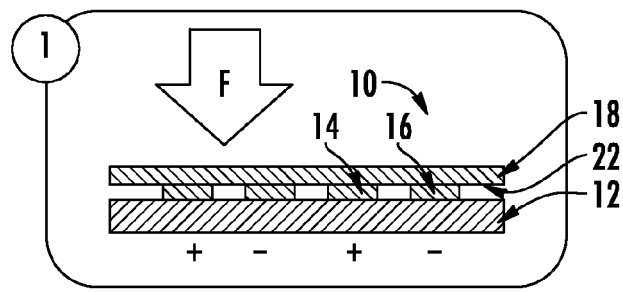
FIG. 3 is a schematic showing application of a force to the pressure sensor of FIG. 1.
Figure 4:
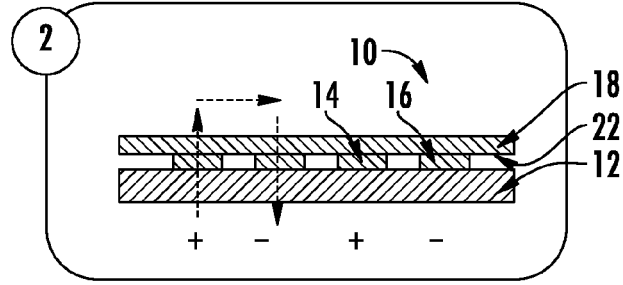
FIG. 4 is a schematic showing a conduction path of the pressure sensor of FIG. 1.

As shown in FIGS. 2-4, the substrate may be positioned below the conductive elements 14, 16 and have a periphery that ends (as shown in FIG. 1) prior to the ends of the conductive elements 14, 16. This allows the ends to be attached to wires or other conductors for communication with a controller, amplifier or other logic or hardware.

The substrate 12 may have a range of thicknesses and may be a structure of an underlying surface of the object being controlled. For example, it may be a dash of an automotive interior with the conductive elements 14, 16 and electroactive layer 18 mounted thereon. The substrate 12 also has the advantage of not only supporting the conductive elements and electroactive layer, but also by "pushing back" at the applied force to facilitate compression of those components.

The first conductive elements 14, as shown in FIG. 1, extend over one edge of the substrate 12 and into the center of the substrate 12. The first conductive elements 14 have rectangular "finger" shapes that are relatively long and in a spaced, parallel arrangement on the substrate 12. The fingers can be manufactured down to 50 microns in width, with similar spacing, between the fingers. Smaller dimensions, such as 10 microns, may be accomplished using alternative manufacturing processes such as aerosol jet printing. Such printing may also include chemical deposition or atomic layer deposition. Printed circuit board etching may also be used. Smaller fingers may be comprised of conductive carbons and other materials less prone to migration than silver or gold.

The second conductive elements 16, as shown in FIG. 1, extend over the opposite edge of the substrate 12 and into the center of the substrate 12. The second conductive elements 16 also have finger shapes and may be constructed similar to the first conductive elements 14. Because of their opposite orientation and parallel construction, the first and second conductive elements 14, 16 may be interdigitated. In other words, the fingers alternate between first and second conductive elements across the middle portion of the substrate 12.

The first and second conductive elements 14, 16 connect respectively to first and second conductors that have attached thereto some form of power supply. This power supply generates a voltage difference between the conductive elements. As is described below, the amount and area of an application of pressure allows for current conduction between the conductive elements of the pressure sensor 10.

As shown in FIGS. 2-4, the electroactive layer 18 extends over the conductive elements 14, 16 and has a common (in the figures, a bottom) surface 22 positioned against or otherwise adhered to the conductive elements 14, 16. The electroactive layer 18 need not be of consistent geometry or thickness and instead merely needs to present some type of a surface for positioning on or proximal to the conductive elements 14, 16. In the illustrated implementation, the electroactive layer 18 is a relatively thin sheet having a rectangular shape that corresponds to the underlying substrate 12.

The electroactive layer 18 preferably has an electrical property which varies with an applied force. For example, the electroactive layer 18 may be comprised of a pressure sensitive material configured to change resistance or conductive/electrical characteristics in response to force or pressure acting thereupon. The pressure sensitive material can behave substantially as an isolator when no force or pressure is present and decreases in resistance as more force or pressure is present. Between low and high forces, the pressure sensitive material responds to force or pressure in a predictable manner, decreasing in resistance with increasing force.

The pressure sensitive material may, for example, be a carbon nanotube conductive polymer. The pressure sensitive material can be applied over the conductive elements 14, 16 by a printing process, such as two- or three-dimensional ink jet or screen printing, vapor deposition, or printed circuit techniques, such etching, photo-engraving, or milling. As pressure sensitive materials with smaller particle sizes are used, such as that of grapheme or a grapheme conductive polymer, the pressure sensitive material may also be applied through printed circuit techniques such as vapor deposition.

According to other implementations, the pressure sensitive material may be a silicene polymer material doped with a conductor, such as silver or copper. According to other examples, the pressure sensitive material can be a quantum tunneling composite (QTC), which is a variable resistance pressure sensitive material that employs Fowler-Nordheim tunneling. The QTC material in the sensors may act as an insulator when zero pressure or zero force is applied, since the conductive particles may be too far apart to conduct, but as pressure (or force) is applied, the conductive particles move closer to other conductive particles, so that electrons can pass through the insulator layer changing the insulator layer changing the resistance of the sensor. Thus, the resistance of the QTC in the sensors is a function of the force or pressure acting upon the sensor.

As shown in FIGS. 3 and 4, the application of a force (F) reduces the resistance of the underlying conduction path (dotted line) between one of the first conductive elements 14 and one of the second conductive elements 16 opposite the force. The voltage difference between the conductive fingers generates a signal in proportion to the drop in resistance which is proportional to the amount of force applied.

Figure 8:
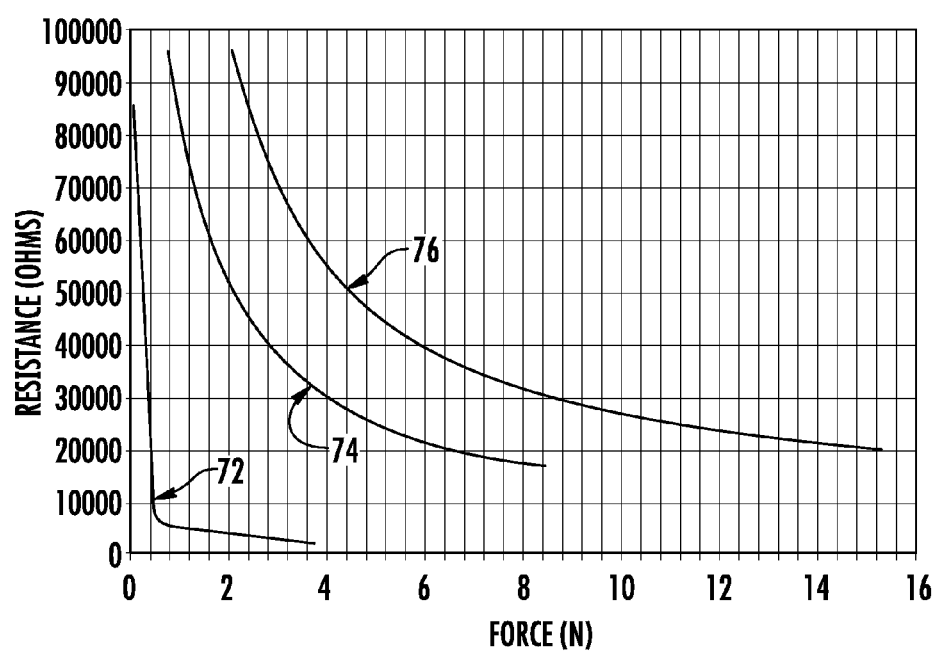
FIG. 8 shows several force-resistance response curves of several pressure sensors.

Advantageously, the size, positioning and other characteristics of the fingers may be employed to modify the characteristic response curve of the sensor beyond the response expected for an electroactive layer 18 interposed between two conductors. For example, as shown in FIG. 8, a characteristic curve of a two-layer sensor having an electroactive layer (comprised of QTC) intervening with a thickness between two conductors has a very small "elbow" between two relatively straight lines (i.e., the Non ID Finger Base Sensor). This is shown by curve 72. This elbow reflects a quick transition after application of a low threshold force.

Figure 6:
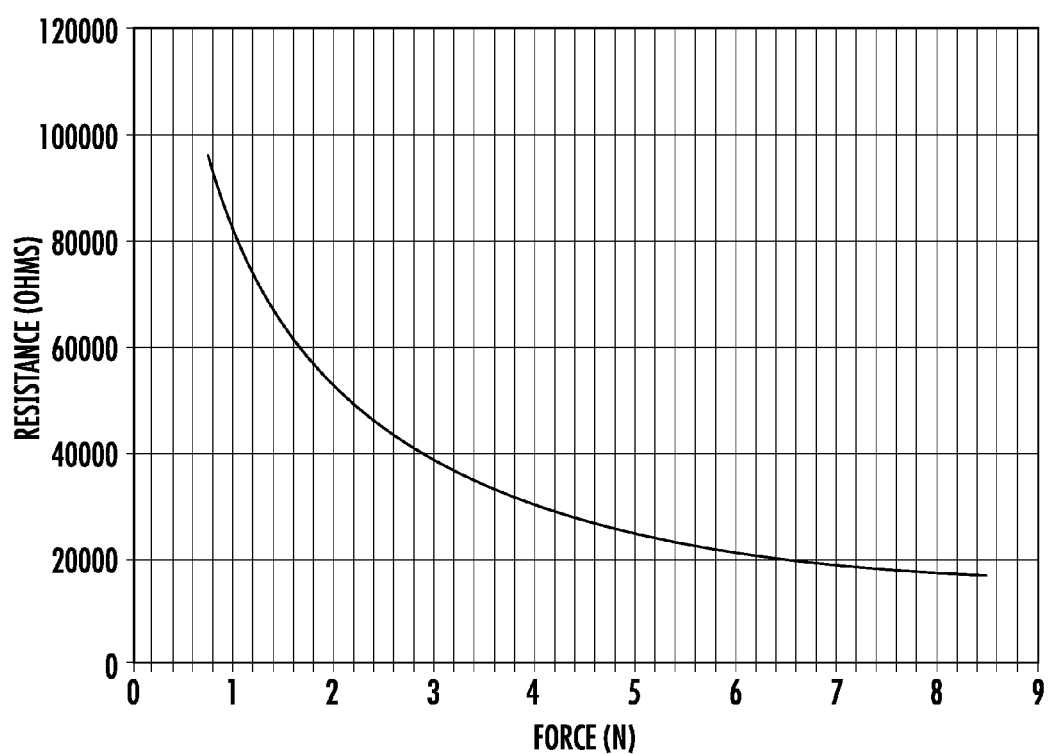
FIG. 6 is a force-resistance response curve of a pressure sensor.
Figure 7:
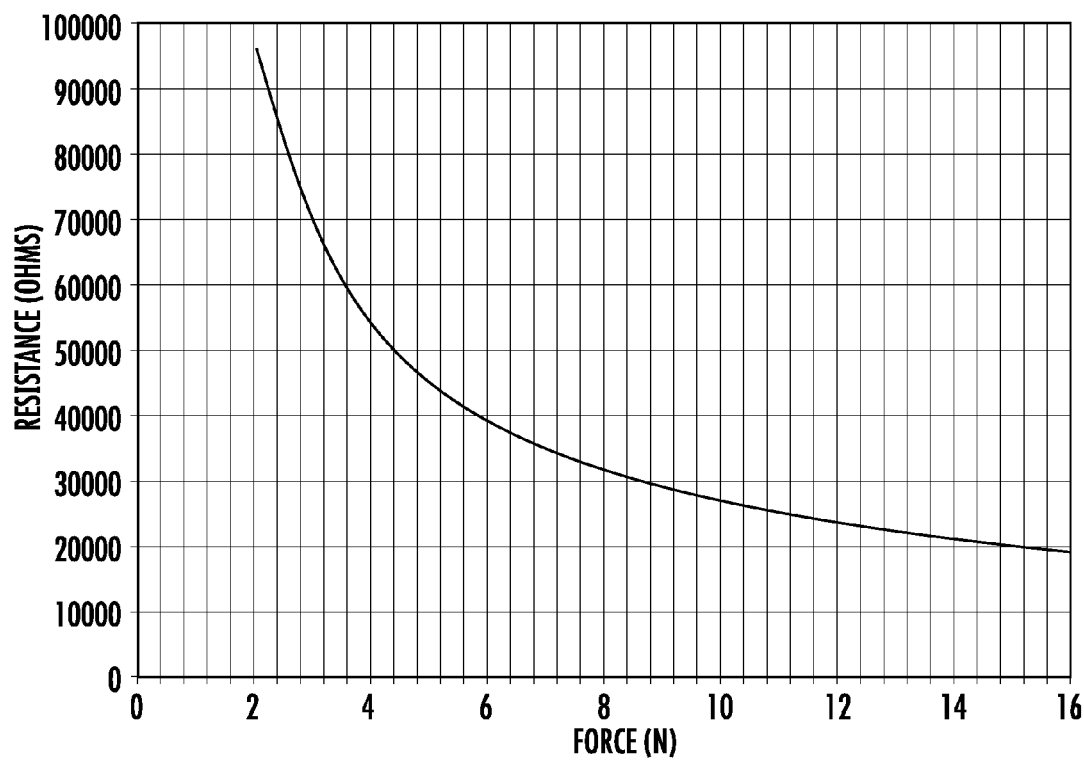
FIG. 7 is a force-resistance response curve of another pressure sensor.

This characteristic curve has its advantages, such as for deterministic on-off switch operation, although it may be less applicable to systems requiring more gradual response characteristics. For example, fuzzy logic systems may benefit from a gradual transition in the force-resistance response of the sensor. Such characteristics can be programmed or custom-crafted using the above-described finger configuration of conductive elements 14, 16 of a single-layer sensor 10. Variations of the finger size, length, and composition and other geometry, can modify and soften the characteristic response curve. For example, FIG. 8 shows the impact of using small ID fingers, such as 0.25 mm, with spacing the same as the finger width. This is shown by curve 74. (FIG. 6 is a dedicated line graph for the small fingers.) The sharp elbow of the two-layer sensor is smoothed out and shifted to the right, requiring higher force application for a drop in resistance. Even larger fingers, such as 0.35 mm finger width and spacing, further smooth and push the curve to the right. This is shown by curve 76. (FIG. 7 is a dedicated line graph for the medium fingers.)

Restated, by modifying one or more finger geometries, such as width or spacing, or finger material, the resultant force-response characteristic curve of the pressure sensor 10 may be changed. For the small and medium finger size and spacing, the curve moves higher on the resistive scale. This causes a greater drop in resistance by a force threshold "F" and therefore a greater force threshold.

The sensor 10 characteristic response curve may be modified by configurations of conductive elements other than finger geometry. For example, the fingers may be shaped in the form of intertwined traces, such as in a spiral pattern, on the substrate 12.

Figure 5:
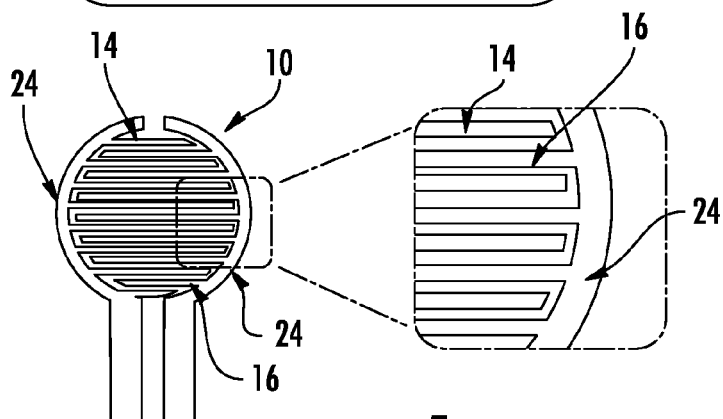
FIG. 5 is a schematic of a circular pressure sensor.

FIG. 5 shows another exemplary geometry of the conductive elements. As shown in FIG. 5, the first conductive elements 14 are on the left and the second conductive elements 16 are on the right. The conductive elements are in the form of fingers extending from arc-shaped traces 24. These traces form a "trunk" for the interdigitated conductive elements 14, 16. The traces 24 extend away from the curved portions to connect with power sources and controls. Advantageously, the overall circular shape of the pressure sensor 10 of FIG. 5 is well suited for a button-style control. The sensor 10 could also be larger for other purposes, rather than the size of a finger tip for a button.

Figure 9:
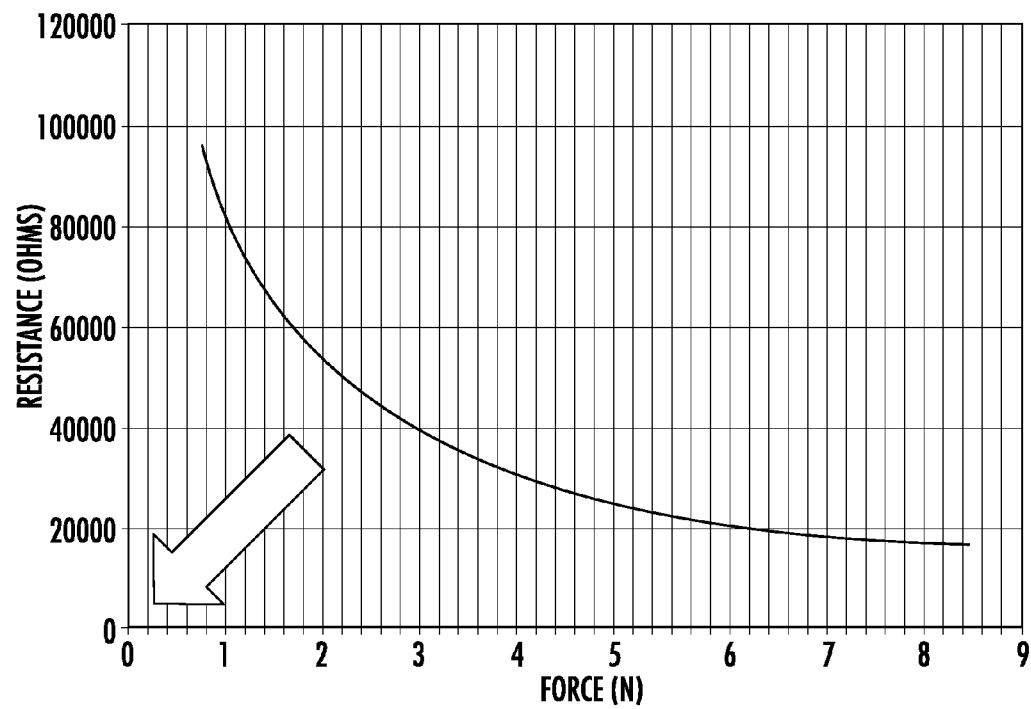
FIG. 9 shows migration of a force-resistance response curve in response to modified configuration of a pressure sensor.
Figure 10:
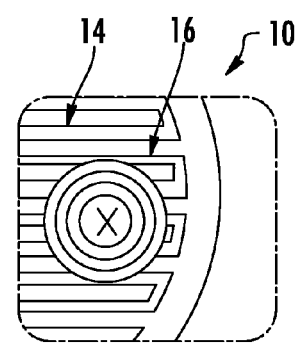
FIG. 10 is a schematic showing recruitment of conductive finger elements under application of a pressure.

Notably, the use of additional or smaller or more closely spaced conductive elements results in migration of the curve toward the characteristic curve of the substrate 12. For example, FIG. 9 shows this progression with an arrow. Another characteristic of smaller fingers is the recruitment of multiple fingers with the application of a pressure over a larger area, as shown in FIG. 10 for example. For example, an increase in applied force may increase the contact area.

Modifying the sensor 10 to use smaller, more closely spaced fingers may be used to expand the range of materials used for the electroactive layer 18 to include less sensitive materials. For example, a carbon ink electroactive layer 18 may be formed by printing carbon ink on a cover layer. The cover layer is then applied over the conductive elements 14, 16 on the substrate 12. Increased force or pressure coincides with increased contact area on the micro fingers, as shown in FIG. 10. The increased contact area results in increased conductivity through increased number of electrical conduction pathways.

Figure 19:
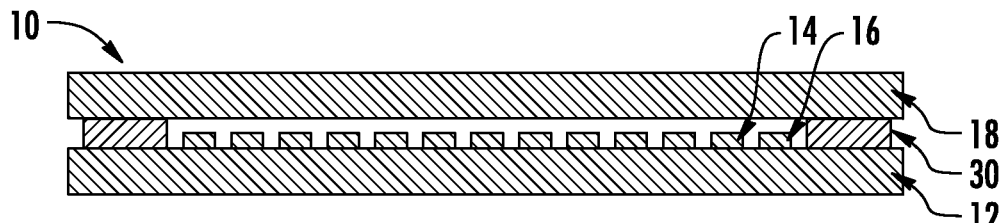
FIGS. 19-22 are schematics of pressure sensors with mechanical features to modify force response curves.

One advantage of carbon ink is that it is less likely (generally) to migrate than silver or softer materials. Therefore, carbon ink may be employed for smaller width and spacing of conductive elements. The carbon ink electroactive layer 18 may also have the characteristic of higher resistance given the curve migration promoted by the use of the small and close elements 14, 16. In this implementation, it may be advantageous to have a small or thin layer between the conductive elements and the electroactive layer 18. This intervening layer could comprise, for example, a liquid adhesive or pressure sensitive adhesive, of 5 microns or more. FIG. 19 shows an adhesive separator layer 30 suspending the electroactive layer 18 above the conductive elements 14, 16.

Figure 20:
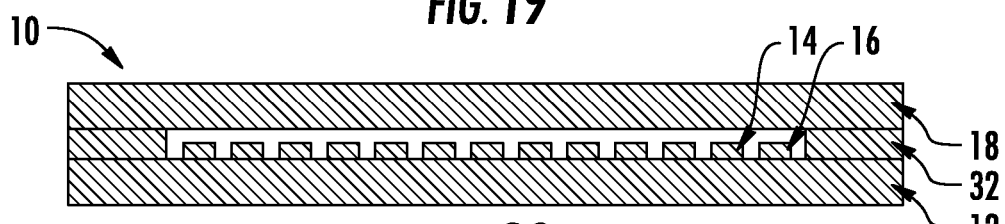
Figure 21:
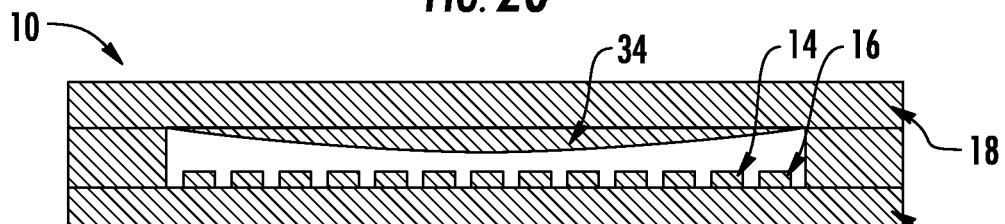
Figure 22:
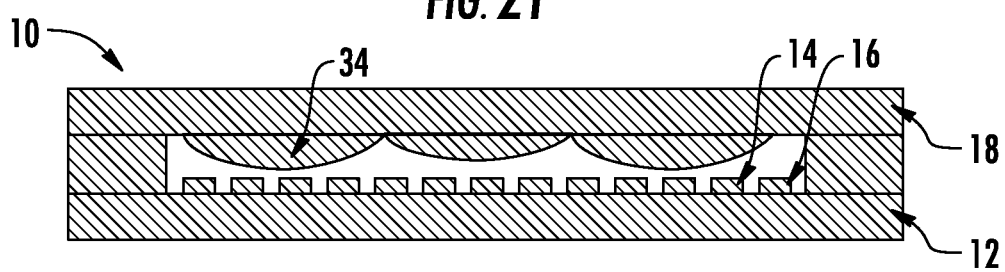

The conductive elements 14, 16 may also be deposited on the substrate with printed circuit board etching, printing, chemical deposition, atomic layer deposition or aerosol jet, for example. The electroactive layer 18 may include a conductive plastic or elastomer in the form of semi-compliant molding. The molding may include a tolerancing feature 32, such as is shown in FIG. 20. The tolerancing feature suspends the upper electroactive layer 18 above the lower substrate and conductive elements 14, 16. Additional molded features 34 provide a geometry that facilitates consistent pressure application and touch location, such as is shown in FIG. 21. The molded feature 34 may include a curved molding with an increased central thickness and tapered ends to increase the sensitivity of the central touch zone with the application of a pressure. Molded features 34 may include several curved embossments, as shown in FIG. 22, for location specific displacement reductions and/or sensitivity increases.

Figure 11:
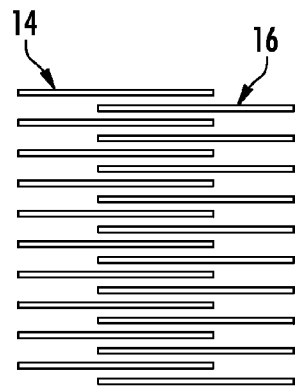
FIG. 11 is a schematic showing equispaced conductive finger elements.
Figure 12:
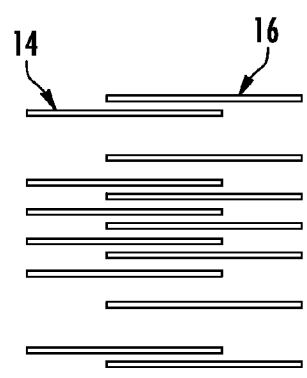
FIGS. 12 and 13 are schematics showing selective spacing of conductive finger elements.

FIGS. 11-15 show implementations that vary finger width, spacing and other geometry to affect the sensitivity of the sensor 10. For example, the spacing and number of conductive elements may be varied to vary the sensitivity within the sensor 10. FIG. 11 shows a regular spacing while FIG. 12 shows an implementation wherein the fingers are more closely spaced at the center of the sensing area. Further apart from the center the spacing is larger for reduced sensitivity.

Figure 13:
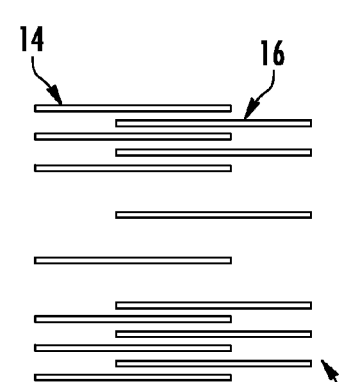

The implementation of FIG. 13, on the other hand, has greater spacing at the center for reduced sensitivity at the center. The spacing and size, and other geometry, of the fingers may be varied across the sensor 10 to focus the sensitivity to specific forces. For example, the distance could be varied based on radial position of a spiral sensor. Or, for strips spacing and finger width can be increased and decreased along the strip. Selectively increased and decreased distances and widths and numbers of the conductive elements may be particularly useful for less sensitive electroactive layers 18.

Figure 14:
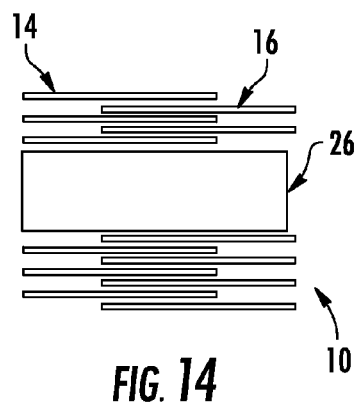
FIG. 14 is a schematic showing selective modification of an electroactive layer of a pressure sensor.

FIG. 14 shows an implementation wherein the electroactive layer 18 may be modified to include higher or lower resistance areas for selective sensitivity of the sensor 10. For example, sensing areas 26 within the sensing zone of the sensor 10 could be doped with relatively lower or higher resistance materials. This deadens or accentuates the sensitivity within the sensing area 26. Another benefit may be repeatability of contact sensing within the given area. Increased sensitivity may be had by use of high sensing materials such as a quantum tunneling composite.

Figure 27A:
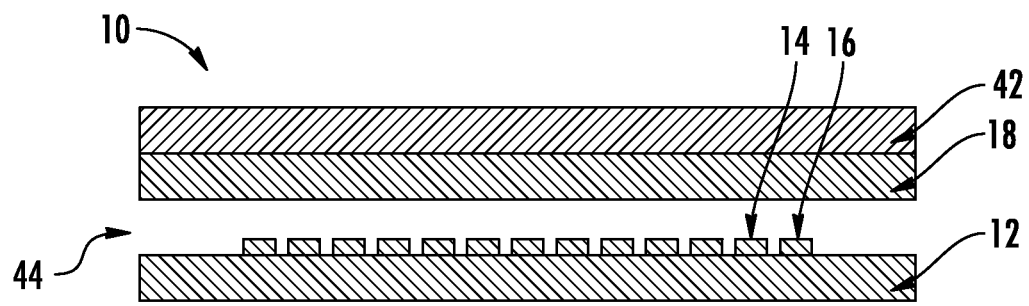
FIGS. 27A and 27B are schematics of hybrid sensors combining single and multilayer architectures.
Figure 27B:
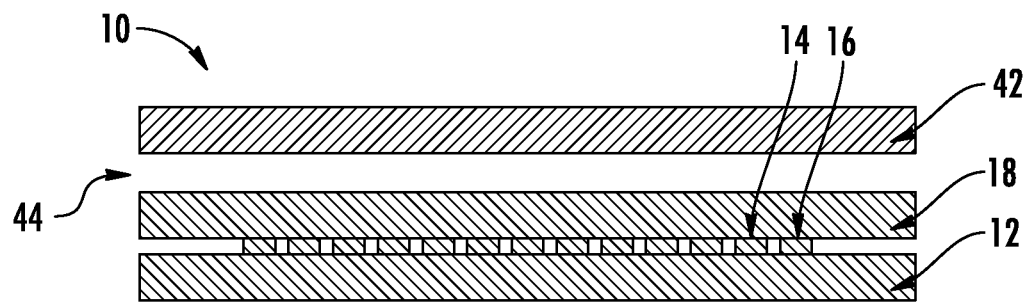

As another option, a hybrid sensor 10 may be created combining single and multi-layer architecture. Example hybrid sensors 10 are shown in FIGS. 27A and 27B. For example, portions of the sensing area may comprise a top electrode 42 and a spacing layer or gap 44 between the electroactive layer 18 and the conductive elements 14, 16 or between the top electrode 42 and the electroactive layer 18. As shown in FIG. 27A, the electroactive layer 18 can be adhered to the top electrode 42, and the gap can be provided between the electroactive layer 18 and the conductive elements 14, 16. Alternatively, as shown in FIG. 27B, the electroactive layer 18 can be adhered to the conductive elements 14, 16, and the gap 44 can be provided between the top electrode 42 and the electroactive layer 18.

The fingers 14, 16 could also be modified to configure the sensor 10's characteristic sensitivity. For example, the finger width may be increased for more robust measurements. Also, the finger material could change from higher to lower resistance materials along its length.

Figure 15:
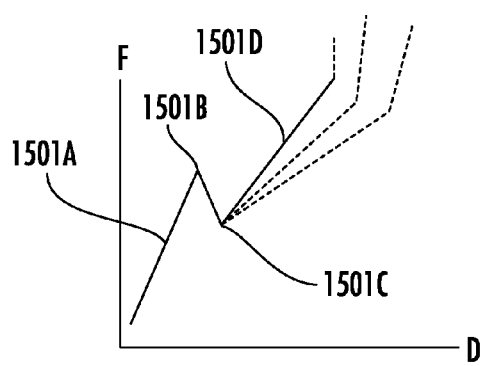
FIG. 15 is a force-displacement line graph of a pressure sensor with a mechanical feature.
Figure 16:
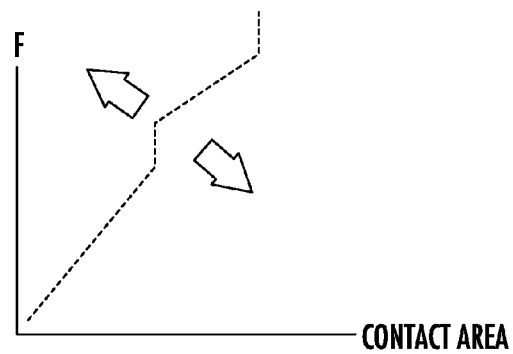
FIG. 16 is a force-contact area line graph of the pressure sensor of FIG. 15.

Mechanical adaptations may also be made to modify the response characteristics of the pressure sensor 10. For example, the characteristic curve shapes of FIGS. 15 and 16 show how a force-displacement element, such as plunger, may be used as an intermediate layer between the first electroactive layer 18 and the conductive elements 14, 16. The intermediate layer may include a deflection element with a physical detent, such as a silicone dome cap. The deflection element may include a secondary feature to engage the outer periphery of the sensing area 26 at higher forces. As shown in FIG. 15, a portion of the characteristic curve 1501A represents the response of the pressure sensor 10 when force is applied to a deflection element such as a dome cap, for example. At point 1501B, the dome cap reaches its design force, and the dome cap crushes at point 1501C. A portion of the characteristic curve 1501D represents the response of the pressure sensor 10 when additional force is applied (e.g., the response of the electroactive layer 18).

Figure 17:
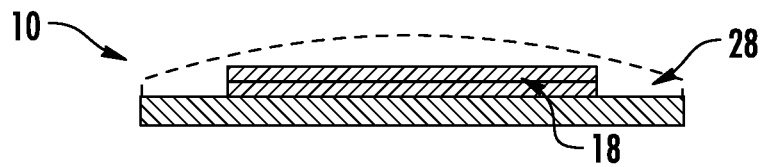
FIGS. 17 and 18 are schematics of pressure sensors with protective coatings.
Figure 18:
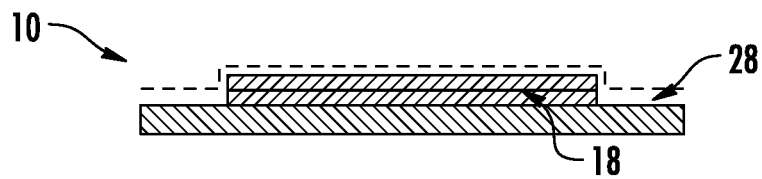

As shown in FIGS. 17 and 18, the pressure sensor 10 may include a coating layer 28 to protect the surface of the electroactive layer 18. The coating 28 may be an organic or inorganic material to provide a sealed, watertight barrier and protect against environmental conditions. Also, the coating 28 may be varied in geometry or composition to provide additional force response curve characteristics. For example, the hardness, stiffness, thickness, shape or material type of the coating 28 may be varied. The coating 28 may be applied by printing, chemical vapor deposition, atomic layer deposition, spraying or dipping. The coating 28 may comprise parylene, silicone, dielectrics, etc. As shown in FIG. 18, the coating may be a secondary substrate adhered on top of the electroactive layer 18.

Figure 23:
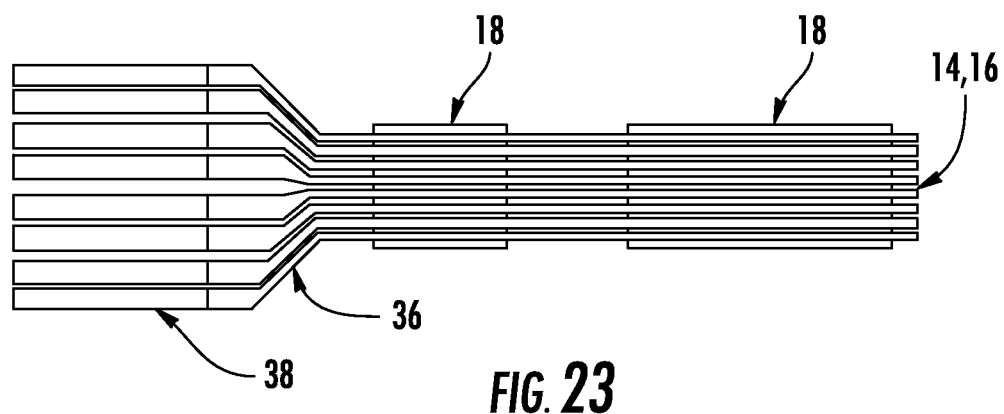
FIGS. 23 and 25 are schematics of a pressure sensor with dedicated signal lines and parallel conductive elements.
Figure 24:
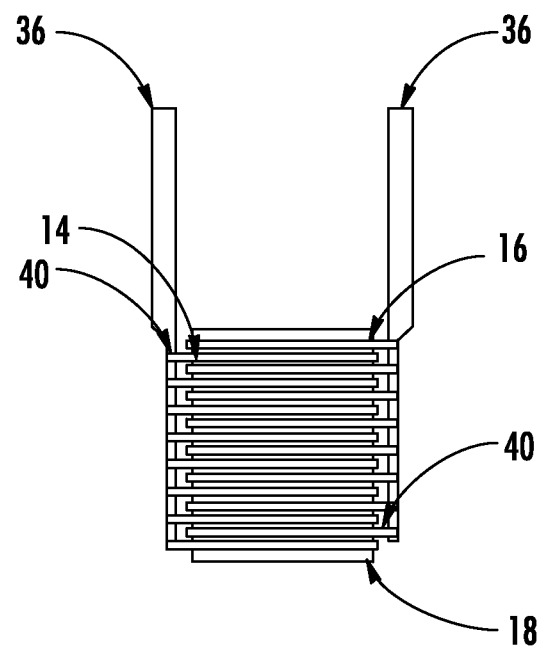
FIGS. 24 and 26 are schematics of a pressure sensor with dedicated signal lines and interdigitated conductive fingers.

As shown in FIGS. 23 and 24, the pressure sensor 10 a plurality of conductive elements may be employed each of which (or some of which) may include dedicated channels.

Figure 25:
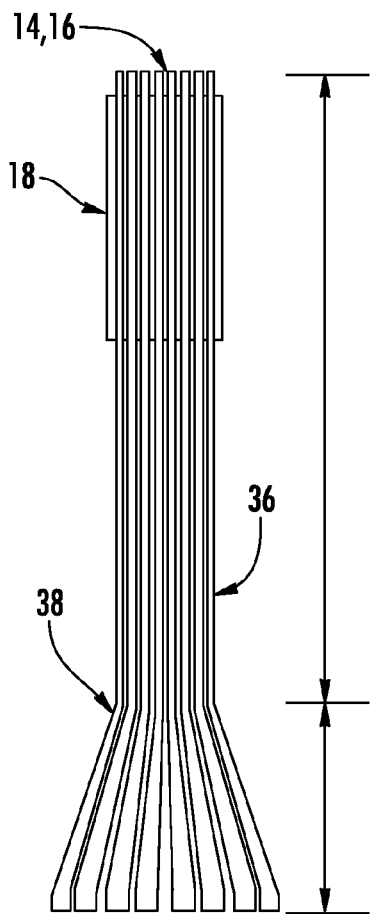

For example, as shown in FIGS. 23 and 25, dedicated ones of linear line traces 36 connect to their respective one of conductive elements 14, 16. The multiple conductive elements are closely spaced in an adjacent, parallel arrangement extending over one or two electroactive layer 18 portions. The line traces 36 may include a flare portion 38 configured for connection or crimping, such as to a 10 mm diameter sensor tail.

Portions of the line traces 36 and conductive elements 14, 16 may comprise different materials. For example, they may both be printed silver. Or, one may be printed silver and the other printed carbon. The line width and spacing may also be varied as described above, such as with 250, 350 or 500 micron widths and/or spacing.

Figure 26:
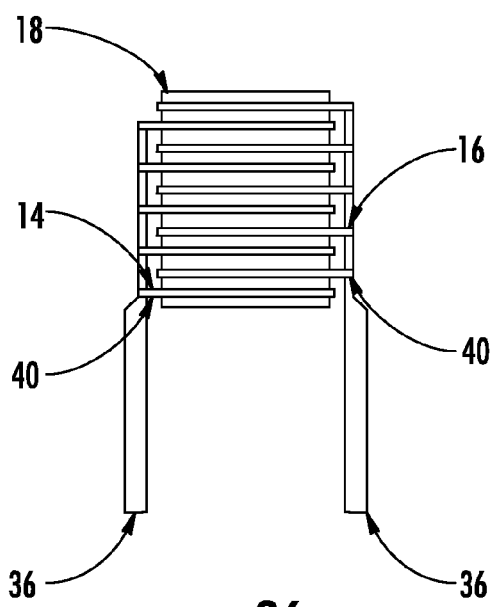

FIGS. 24 and 26 show another example of a rectangular-shaped pressure sensor 10 having a rectangular electroactive layer 18 and interdigitated, equal-length fingers 14, 16. Each of the fingers has its own dedicated channel via adjacently stacked line traces 36 extending along lateral edges 40 of the fingers 14, 16. The line traces 36 and fingers 14, 16 may be comprised entirely of the same silver or carbon material. Or, the line trace connects may be comprised of a different material than the fingers, such as silver when the fingers are carbon. Additionally, the line traces 36 may be laid or printed outside of the electroactive layer 18 area. The pressure sensor 10 may have an overall size of about 10 or 15 mm with the finger and trace width and spacing in the 250 to 350 or 500 micron range.

The dedicated channels provide multiple output lines for readings from the sensor 10. These outputs from these lines can be compared to each other over varying distances. Multiple output lines may facilitate tracking moving along the length of the sensor since resistance increases with distance from the input (applied pressure). Also, multiple output lines allow for redundant self-checking or double parsing results. Sensor or computer logic can check adjacent or proximal lines bridged by an applied force or pressure. The multiple outputs may also be used to determine width-wise position or the area of the applied force.

Figure 28:
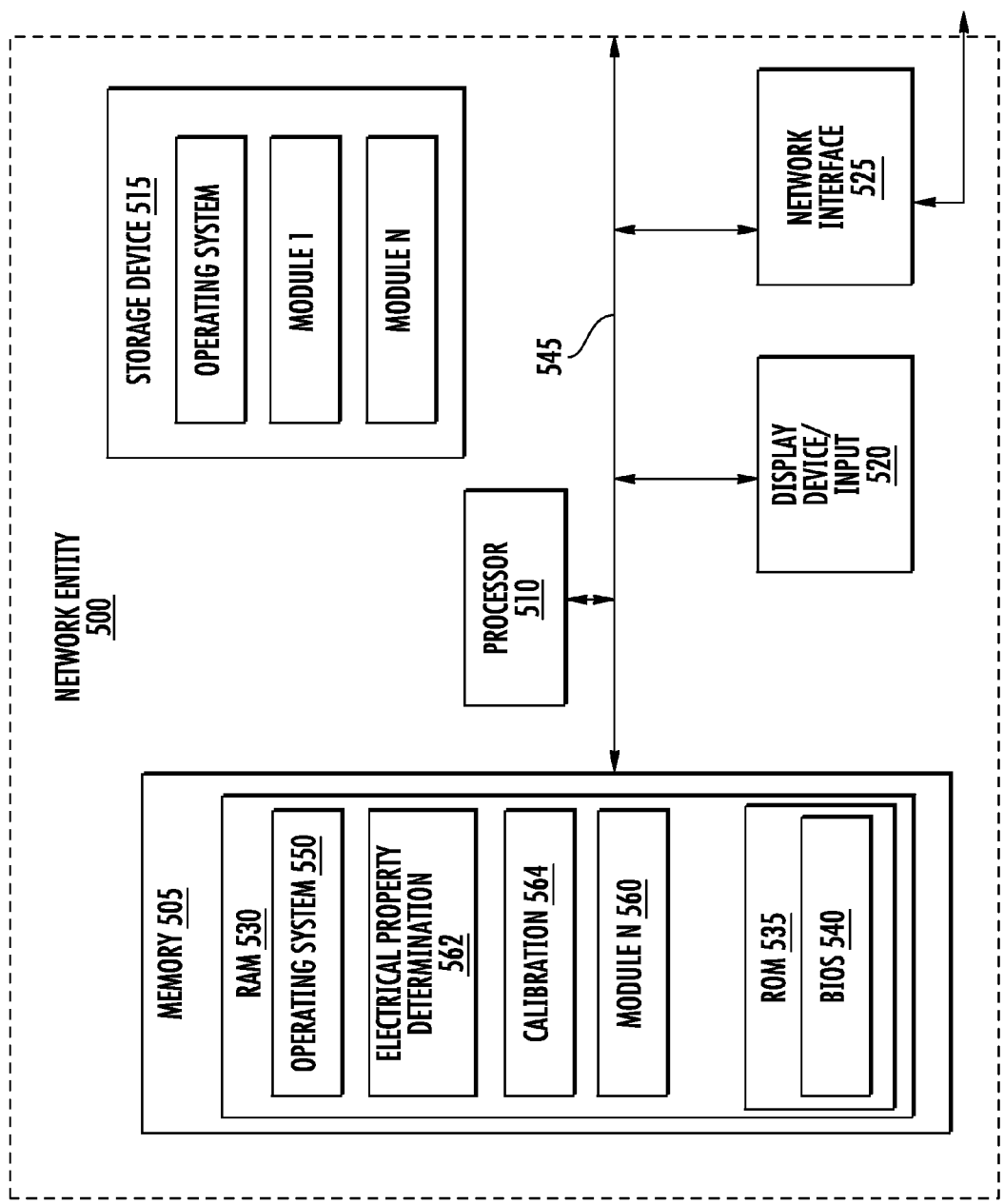
FIG. 28 is a schematic of a pressure sensor system including hardware, software and other components.

Referring now to FIG. 28, a schematic diagram of a central server 500, or similar network entity, configured to implement a sensor system, according to one implementation of the invention, is provided. As used herein, the designation "central" merely serves to describe the common functionality the server provides for multiple clients or other computing devices and does not require or infer any centralized positioning of the server relative to other computing devices. As may be understood from FIG. 28, in this implementation, the central server 500 may include a processor 510 that communicates with other elements within the central server 500 via a system interface or bus 545. Also included in the central server 500 may be a display device/input device 520 for receiving and displaying data. This display device/input device 520 may be, for example, a keyboard or pointing device that is used in combination with a monitor. The central server 500 may further include memory 505, which may include both read only memory (ROM) 535 and random access memory (RAM) 530. The server's ROM 535 may be used to store a basic input/output system 540 (BIOS), containing the basic routines that help to transfer information across the one or more networks.

In addition, the central server 500 may include at least one storage device 515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide nonvolatile storage for a central server. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 530. Such program modules may include an operating system 550 and a plurality of one or more (N) modules 560. The modules 560 may control certain aspects of the operation of the central server 500, with the assistance of the processor 510 and the operating system 550. For example, the modules may perform the functions described above and illustrated by the figures and other materials disclosed herein. The modules may include an electrical property determination module 562 that is configured to determine an electrical property of the electroactive layer based connection to the conductive elements. Further, the modules may include a calibrator module 564 configured to determine the magnitude of a pressure using a voltage difference between the conductive elements.

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

10 pressure sensor
12 substrate
14 first conductive elements
16 second conductive elements
18 electroactive layer
20 elongate edges
22 common surface
24 arc-shaped traces
26 sensing area
28 coating
30 adhesive separator layer
32 tolerancing feature
34 molded feature
36 line traces
38 flare
40 lateral edges
42 top electrode 44 gap
72 Non-ID Finger Base Sensor curve
74 Small ID Finger Sensor curve
76 Medium ID Finger Sensor curve

The invention claimed is:

1. A sensor for sensing an application of pressure, the sensor comprising:
a substrate;
at least first and second conductive elements supported on the substrate and having elongate edges spaced apart from each other; and
a single electroactive layer for electrically connecting the first and second conductive elements, the single electroactive layer being disposed on the first and second conductive elements and having a common surface adhered against the first and second conductive elements, the single electroactive layer defining at least one electrical property in a portion of the single electroactive layer between the first and second conductive elements, the electrical property configured to vary in relation to a magnitude of the pressure, wherein the electrical property exhibits a characteristic curve that at least partially varies as a function of a distance between the elongate edges, and wherein the single electroactive layer provides a conductive path between the first and second conductive elements.

2. A sensor of claim 1, wherein the electrical property is a resistance.

3. A sensor of claim 1, further comprising a logic device connected to the first and second conductive elements and configured to determine the electrical property.

4. A sensor of claim 3, further comprising a power source connected to the first and second conductive elements and wherein the electrical property is a resistance generating a voltage difference between the first and second conductive elements and wherein the voltage difference varies in proportion to the magnitude of the pressure.

5. A sensor of claim 4, wherein the logic device includes a calibrator configured to determine the magnitude of the pressure using the voltage difference.

6. A sensor of claim 1, wherein the single electroactive layer comprises at least one of a quantum tunneling composite, a nanotube doped ink or a doped carbon ink.

7. A sensor of claim 1, wherein the first and second conductive elements have a spiral pattern.

8. A sensor of claim 1, wherein the first conductive element includes a plurality of first fingers and the second conductive element includes a plurality of second fingers.

9. A sensor of claim 8, wherein the first fingers extend between the second fingers.

10. A sensor of claim 9, wherein the first fingers are in a parallel spaced array and wherein the second fingers are in a parallel spaced array.

11. A sensor of claim 10, wherein the first and second fingers alternate across the common surface to form a plurality of adjacent edges spaced apart from each other.

12. A sensor of claim 11, wherein the first and second fingers extend in different directions.

13. A sensor of claim 12, wherein the first fingers extend from a first trunk trace and wherein the second fingers extend from a second trunk trace.

14. A sensor of claim 13, wherein the first trunk trace has a first concavity and the second trunk trace has a second concavity and wherein the first and second concavities face each other.

15. A sensor of claim 14, wherein the first fingers extend into the first concavity in a direction opposite the second fingers extending into the second concavity.

16. A sensor of claim 15, wherein the fingers and trunks define a circular pressure sensitive region.

17. A sensor of claim 8, wherein at least one pair of first and second fingers has a closer spacing than another pair of first and second fingers.

18. A sensor of claim 17, wherein the closer spacing defines an area of higher sensitivity to the pressure.

19. A sensor of claim 8, wherein the single electroactive layer has a varied resistance between different pairs of first and second fingers.

20. A sensor of claim 19, wherein the varied resistance is higher between at least one pair of first and second fingers or the varied resistance is lower between at least one pair of first and second fingers.

21. A sensor of claim 1, wherein an increase of the distance increases a threshold for detection of the application of pressure.

22. A sensor of claim 21, wherein an increase of a width of the first and second conductive elements increases the threshold for detection of the application of pressure.

23. A sensor of claim 22, wherein the increase of at least one of the distance or the width increases a radius of curvature of the characteristic curve.

24. A sensor of claim 1, wherein the single electroactive layer is adhered against the first and second conductive elements using an adhesive layer.

25. A sensor of claim 1, further comprising a coating deposited on the single electroactive layer, wherein the coating is impermeable to water or the coating is configured to adjust the characteristic curve.

26. A sensor of claim 25, wherein the coating adjusts the characteristic curve using at least one of a hardness, stiffness, thickness, material composition or shape.

27. A sensor of claim 1, wherein a portion of the single electroactive layer includes an at least partially compliant molding, the compliant molding including a conductive polymer or a conductive elastomer.

28. A sensor for sensing an application of pressure, the sensor comprising:
a substrate;
at least first and second conductive elements supported on the substrate and having elongate edges spaced apart from each other;
a single electroactive layer for electrically connecting the first and second conductive elements, the single electroactive layer being disposed on the first and second conductive elements and having a common surface adhered against the first and second conductive elements, the single electroactive layer defining at least one electrical property in a portion of the single electroactive layer between the first and second conductive elements, the electrical property configured to vary in relation to a magnitude of the pressure, and wherein the single electroactive layer provides a conductive path between the first and second conductive elements; and
a force-deflection element coupled to a side of the single electroactive layer opposite the substrate.

29. A sensor of claim 28, wherein the force-deflection element includes a detent.

30. A sensor of claim 29, wherein the force-deflection element includes a secondary feature that decreases a contact area of the force-deflection element.

* * * * *